T. K. KEITH.

MACHINERY FOR CUTTING AND BLACKING WELTS FOR BOOTS AND SHOES.

No. 6,938. Reissued Feb. 22. 1876.

WITNESSES

J. H. Gately

R. A. Frorge

INVENTOR.

Thos. K. Keith

By his Att'ys.

Henry W. Williams & Co

N. PETERS, PHOTO-LITHOGRAPHER, WASHINGTON, D. C.

UNITED STATES PATENT OFFICE

THOMAS K. KEITH, OF HAVERHILL, ASSIGNOR OF ONE-HALF INTEREST TO AUGUSTUS SEAVER, OF MILFORD, MASSACHUSETTS.

IMPROVEMENT IN MACHINERY FOR CUTTING AND BLACKING THE WELTS FOR BOOTS AND SHOES.

Specification forming part of Letters Patent No. 170,955, dated December 14, 1875; reissue No. 6,938, dated February 22, 1876; application filed February 2, 1876.

*To all whom it may concern:*

Be it known that I, THOMAS K. KEITH, of Haverhill, in the county of Essex and State of Massachusetts, have invented a new and Improved Machine for Cutting and Blacking the Welts in Boots and Shoes; and I do hereby declare that the following is a full, clear, and exact description thereof, reference being had to the accompanying drawings and to the letters of reference marked thereon.

By means of this device the welt is cut, blacked, and the seam rubbed down by sewing-machine power, at one operation.

Figure 1:
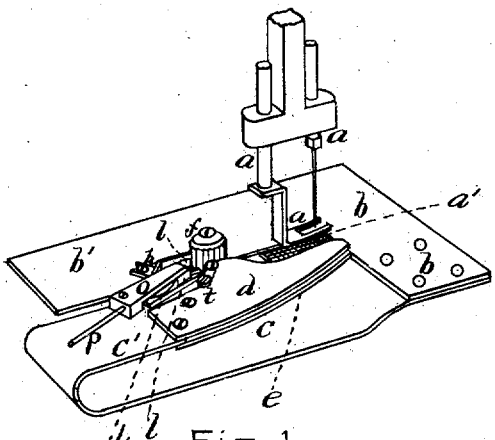
Figure 2:
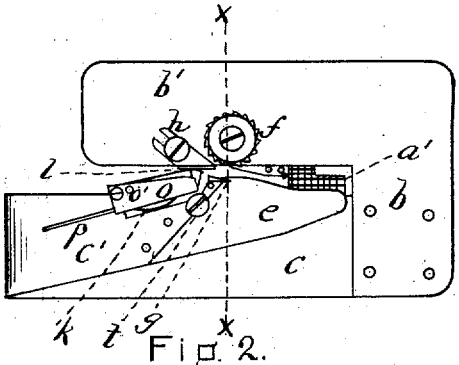
Figure 3:
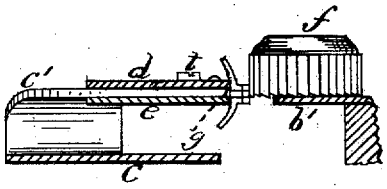
Figure 4:
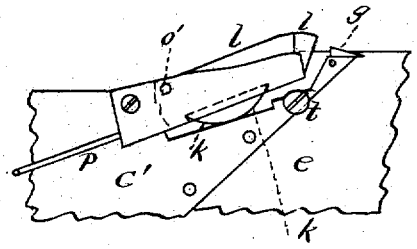
Figure 5:
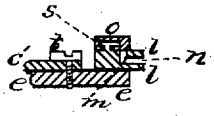

In the accompanying illustration, Figure 1 is a perspective view of my invention attached to a sewing-machine suitable for the purpose. As the sewing-machine is no part of the invention, a small portion only is shown in the drawing. Fig. 2 is a plan view of my invention with the plate *d* removed. Fig. 3 is an enlarged transverse section of my device upon the broken line *x x*. Fig. 4 is an enlarged plan of a portion of the machine with the plate *d* removed. Fig. 5 is an enlarged sectional view of the inking or blacking apparatus.

Similar letters of reference indicate corresponding parts.

*a* represents certain portions of a suitable sewing-machine, which sews the welt into the upper, making a seam. *a'* is the feed of the sewing-machine. *b b'* is a plate, from which extends the plate *c*, which plate *c*, after extending to a proper length—say, the length of a boot—turns up and back, and forms the portion *c'*. Projecting from the plate *c'* are two plates, *d* and *e*, which are attached, respectively, to the upper and under sides. *f* is a wheel turning freely upon an arbor attached to the plate *b*. Opposite the wheel *f*, and fixed between the plates *d* and *e*, near the terminus of plate *c'*, is the knife *g*, which cuts or takes out the welt.

The upper is placed in my machine with the welt between the plates *d e*, and the upper extending over and under them. The feed *a* carries it along to the knife *g*, where, being pressed against it by the wheel *f*, it is cut or taken out by said knife, and comes out from between the plates *d* and *e* at the point where it strikes the edge of plate *c'*.

*h* is a guide held by a screw, and capable of being adjusted at will, as seen in Figs. 1 and 2. If desired, a wheel or feed may be substituted for it. *k* is a spring, placed upon the plate *e*, and against the edge of the plate *c'*. *l* is a box, pivoted at *o'*, and having an opening, *m*, in its upper side, and an opening, *n*, in the side or edge opposite to the guide *h*. This box and its openings are shown in Fig. 5. *o* is a blacking apparatus, hollow, supplied with blacking by means of pipe *p*, and having an opening, *s*, (see Fig. 5,) in its under side corresponding to the opening *m* in box *l*.

When not in use the box *l* is kept pressed out into the position shown in Figs. 2, 4, and 5, by means of the spring *j*. In this position, it will be seen, by reference to Fig. 5, the openings *s* and *m* do not meet, and therefore no blacking can pass from the apparatus *o* to the box *l*.

Now, when the upper and welt have passed through the cutting operation above described by means of which the welt is taken out, the said upper and the remaining portion of the welt pass along until they reach the guide *h*. When they arrive at the guide, in passing between it and the projecting edge of the box *l*, the said box *l* is pressed back until the opening *m* is opposite or under the opening *s* in the blacking apparatus. The blacking then passes through the two openings into the box *l* and through the opening *n* upon the welt, thoroughly blacking it.

The amount or flow of blacking can be easily regulated by turning the cam *t*, which would operate upon the apparatus *o* so as to prevent the openings from coming exactly opposite each other. By the above-described means the welt is cut, blacked, and the seam rubbed down in a thorough and workmanlike manner.

It will readily be seen that the plate *c'*, by bending over into the shape seen in the drawing, forming the plate *c'*, and having the plates *d* and *e* attached, forms a spring pressing toward the wheel or rubbing-down device *f*, thus keeping the work tightly in place.

In practical operation the welt is cut, blacked, set up, and the seam rubbed down in a single passage through the machine.

Having thus fully described my invention, what I claim, and desire to secure by Letters Patent, is—

1. The combination of the knife *g* and spring-plates *d e*, constructed and operated substantially as described.

2. In combination with the knife *g*, and spring-plates *d e*, the wheel *f*, constructed, operated, and combined substantially as herein set forth.

3. The combination of the spring-plates *d e*, and the wheel *f*, substantially as and for the the purposes above set forth.

4. The combination of the blacking apparatus *o*, having the opening *s* upon its under side, with the box *l*, provided with openings *n* and *m*, substantially as and for the purpose specified.

5. The combination of the device *l m n* with the spring *k*, substantially as and for the purpose hereinbefore set forth.

THOMAS K. KEITH.

Witnesses:
HENRY W. WILLIAMS,
E. W. WATKINS.